Aug. 25, 1959     H. E. McNALLY     2,901,593
VEHICLE LIGHT
Filed Jan. 14, 1958
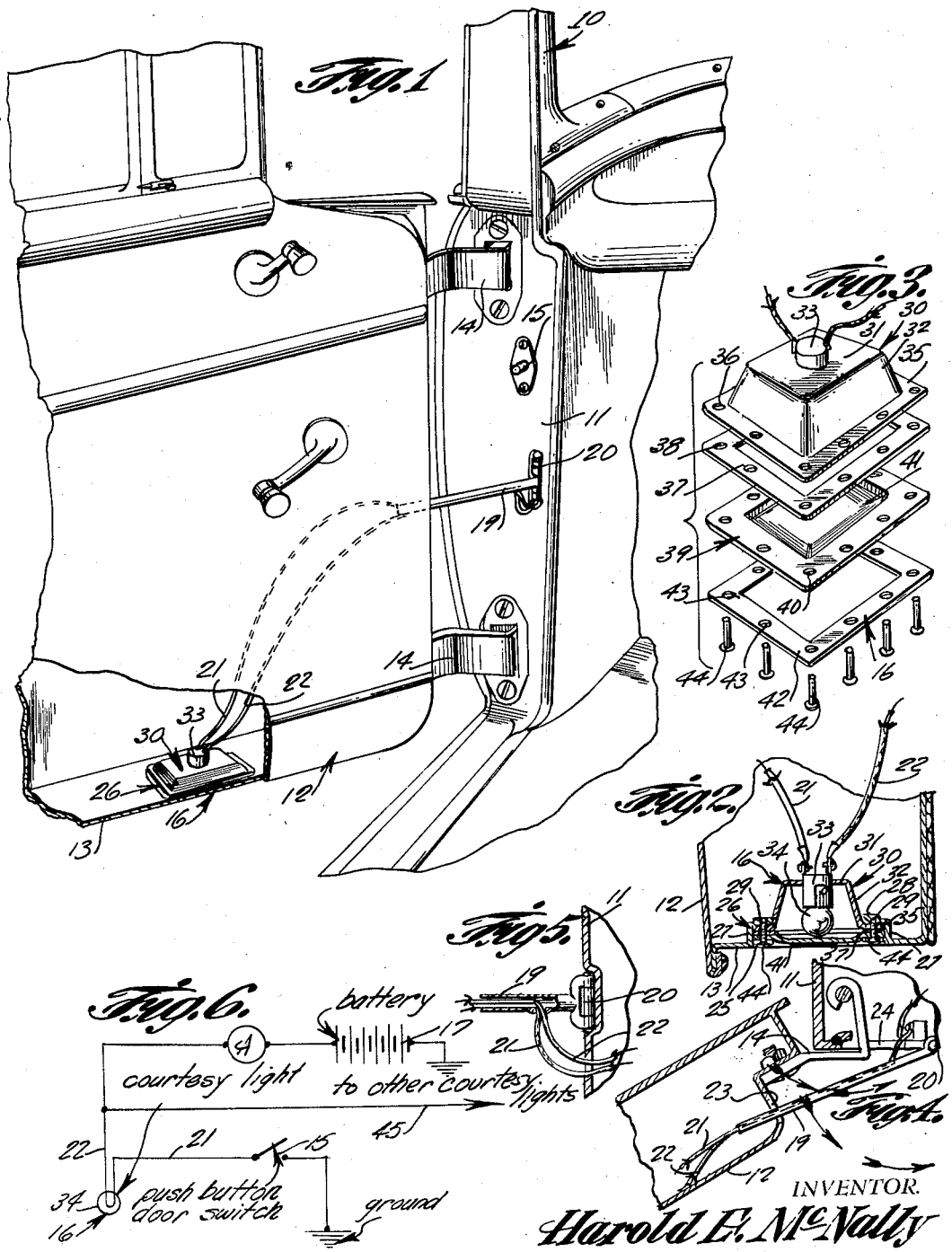
INVENTOR.
Harold E. McNally
BY Victor J. Evans & Co.
ATTORNEYS

United States Patent Office 2,901,593
Patented Aug. 25, 1959

2,901,593

VEHICLE LIGHT

Harold E. McNally, Fort Lauderdale, Fla., assignor of one-half to Cecil H. Nelson, Fort Lauderdale, Fla.

Application January 14, 1958, Serial No. 708,940

2 Claims. (Cl. 240—7.1)

This invention relates to a vehicle, and more particularly to a light for illumination means for a vehicle.

The object of the invention is to provide a light assembly which is adapted to be mounted in the bottom of a vehicle door, so that when the door is opened the light is automatically turned on to thereby illuminate the portion of the ground adjacent the door.

Another object of the invention is to provide a vehicle light assembly which includes units that are adapted to be mounted in the bottom of vehicle doors such as automobile doors, so that when such doors are opened, the lights in the bottom of the doors are automatically actuated or turned on whereby the area in the vicinity of the doorway or door will be illuminated so that persons entering or leaving the vehicle will be able to step without tripping or the like.

A further object of the invention is to provide a vehicle light assembly which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary perspective view illustrating the light assembly of the present invention, and with parts broken away and in section.

Figure 2 is a fragmentary vertical sectional view illustrating one of the light units mounted in the bottom of the door.

Figure 3 is a fragmentary perspective view showing one of the light units in disassembled relation.

Figure 4 is a fragmentary sectional view taken through the door and door frame.

Figure 5 is an elevational view, with parts broken away and in section, showing the hinge connection between the tube and door frame.

Figure 6 is a view illustrating schematically the wiring diagram of the present invention.

Referring in detail to the drawings, the numeral 10 indicates a portion of a conventional vehicle such as an automobile, and the vehicle 10 includes a body having door frames 11, while the numeral 12 indicates the usual doors which are provided with bottoms 13, and the doors 12 are hingedly connected to the door frames 11 by means of hinges 14. An "on" and "off" switch 15 is supported by the door frame 11 and the switch 15 is adapted to be engaged by or actuated by the door 12 when the door 12 is in closed position.

The present invention is directed to a light unit which is indicated generally by the numeral 16, and the light unit 16 is mounted in the bottom of the door 12 so that when the door is opened, the area in the vicinity of the doorway is automatically illuminated so that persons may enter or leave the vehicle through the doorway with greater ease or safety. As shown in Figure 6, there is provided the usual vehicle battery 17 and the numeral 18 indicates the ground connections in the electrical circuit.

The numeral 19 indicates a hollow tube which is hingedly or pivotally connected to the door frame 11 by means of a hinge 20, and conductor wires 21 and 22 extend through the tube 19. The side of the door 12 is provided with a cutout 23 which provides clearance for the tube 19 when the door moves to closed position. The door frame 11 is provided with an opening or cutout 24 whereby the wires 21 and 22 can extend therethrough, Figure 4.

As shown in Figure 2 for example, it will be seen that the bottom 13 of the door 12 is provided with an opening 25, and the lower portion of the door surrounding the opening 25 is struck-up so as to define a support portion 26, and the support portion 26 includes a vertically disposed section 27 which terminates in a horizontally disposed flange 28. The flange 28 is provided with threaded sockets 29.

The light unit 16 further includes a hollow casing which is indicated generally by the numeral 30, and the casing 30 includes a top section 31 and a flaring portion 32. A socket 33 is supported by the top section 31, and a light bulb 34 engages the socket 33, Figure 2. The flaring portion 32 terminates in a horizontally disposed lip 35 which is arranged immediately below the flange 28 when the parts are in assembled position. The lip 35 is provided with a plurality of spaced apart apertures or openings 36, Figure 3. Arranged below the lip 35 is a first rectangular bracket or gasket 37 which is provided with a plurality of apertures 38. Arranged below the bracket 37 is a cover member 39 which is provided with apertures 40, and the cover member 39 includes a central portion 41 which may be made of transparent or translucent material. There is further provided a lower bracket or retainer 42 which is provided with apertures 43, and the numeral 44 indicates securing elements such as bolts which extend through the registering apertures 43, 40, 38, 36, and into engagement with the threaded socket 29 whereby the parts will be maintained in their proper assembled position.

As shown in Figure 6, wires such as the wires 45 can be used for connecting the various lights 34 which are arranged in other doors, together.

From the foregoing, it is apparent that there has been provided a light assembly for use with a vehicle such as an automobile, and wherein the light assembly includes the units 16 which are arranged and constructed so that when the door of the vehicle is opened, the light unit is automatically turned on or illuminated so that the area in the vicinity of the doorway below the door is illuminated whereby persons can enter or leave the vehicle with greater safety and ease.

According to the present invention, the tube 19 is pivotally connected to the frame 11 by means of the hinge 20, and the door 12 has a cutout 23 which provides clearance for the tube 19. The bottom 13 of the door 12 is provided with the opening or cutout 25 and there is provided a struck-up support portion 26 which surrounds the opening 25. This support portion 26 includes the section 28 which has the threaded bores 29 whereby the screws 44 can be extended through the registering apertures 43, 40, 38, 36, and into engagement with the sockets 29 so that the parts will be maintained in their proper assembled position.

The light unit 16 includes the casing 30 which carries the socket 33, and the light bulb 34 is connected to the socket 33. The wires 22 lead from the socket 33 as shown in the drawings, and when the door 12 is moved to closed position, the switch 15 is actuated to interrupt the circuit to the bulb 34 so that the bulb is off when the door is closed. The wires 22 extend through the tube 19 and through the opening 24 in the door frame 11, and the door 12 is provided with an opening 23 to provide clearance for the tube 19 as the door moves back and forth between open and closed positions.

It is to be understood that each of the doors of the automobile or vehicle is adapted to be equipped with a light unit such as the light unit 16, so that when any of the doors are opened, the light unit will be automatically actuated whereby the ground surface or area in the vicinity of the door being opened will be automatically illuminated or lit up.

In the event that a bulb such as the bulb 34 has to be replaced or changed, it is only necessary to remove the screws 44 whereby the bracket 42 and cover member 39 can be removed so that the bulb 34 can be replaced or changed and then the cover member 39 and bracket 42 are returned to their original position.

The parts can be made of any suitable material and in different shapes or sizes.

Furthermore, the position of the light may be at any location in the bottom or side plate of the door. The purpose of the light unit is to illuminate an area just outside the car where a person is about to step, so as to insure that the person can step on good firm ground whereby the possibility or risk of falling will be minimized or eliminated. Furthermore, the light will make it easy to find keys or other objects which may have dropped from the car or which may be kicked out of the car when the door is opened. The unit can be installed as new equipment on new cars although with slight modification, the device can be installed on older or existing vehicles. The size or candle power of the bulb 34 can be varied as desired. The cover member 39, may be made of a suitable material such as plastic and this member may constitute a lens which serves to throw a flood of light rather than a spot of light. The bracket such as the bracket 37 may be made of a suitable material such as cork, rubber or the like.

The light unit fo the present invention is adapted to direct the light to the ground and since the light goes on automatically when the door opens, a person has both hands free for use in alighting from the automobile. The unit is installed in the door itself and serves to direct light to the ground around and under the automobile and it can be used in any or all of the doors of the vehicle. The unit will light up the area as the door swings so that persons will be able to get into or out of the vehicle with greater comfort and safety.

Minor changes in shape, size and rearrangement of details coming within the field of invention claimed may be resorted to in actual practice, if desired.

I claim:

1. In a vehicle, a body including at least one door frame, a door hingedly connected to said frame, an "on" and "off" switch carried by the frame for selective engagement by the door, a hollow tube hingedly connected to said frame, there being an aperture in said door for receiving said tube, conductor wires extending through said tube and connected to said "on" and "off" switch, there being a cutout in said door frame for providing clearance for the wires, there being an opening in the bottom of the door, a support portion extending upwardly from the bottom of the door and said support portion including a vertically disposed section terminating in a horizontally disposed flange, there being threaded sockets in said flange, a casing including a top section, a socket member supported by said top section, a light bulb in said socket member, said socket member being electrically connected to said wires, said casing further including a flaring portion terminating in a horizontally disposed lip arranged contiguous to the lower surface of said flange, a first rectangular bracket arranged below said lip, a cover member arranged below said bracket, a second bracket arranged below said cover member, there being registering openings in said brackets, cover member and lip, and securing elements extending through said registering openings and engaging the threaded sockets in said flange.

2. In a vehicle, a body including a door frame, a door hingedly connected to said frame, a switch carried by the frame for selective engagement by the door, a hollow tube hingedly connected to said frame, conductor wires extending through said tube and connected to said switch, a support portion extending upwardly from the bottom of the door and said support portion terminating in a horizontally disposed flange, there being threaded sockets in said flange, a casing, a socket member supported by said casing, a light bulb in said socket member, said socket member being electrically connected to said wires, said casing further including a flaring portion terminating in a horizontally disposed lip arranged contiguous to the lower surface of said flange, a first bracket arranged below said lip, a cover member arranged below said bracket, a second bracket arranged below said cover member, and securing elements for said brackets, cover member and lip engaging the threaded sockets in said flange.

References Cited in the file of this patent

UNITED STATES PATENTS

| | | |
|---|---|---|
| 1,248,930 | Schulz | Dec. 4, 1917 |
| 2,677,752 | Kaiser | May 4, 1954 |